United States Patent [19]
Cook et al.

[11] Patent Number: 5,299,849
[45] Date of Patent: Apr. 5, 1994

[54] COVER ASSEMBLY FOR USE ON A VEHICLE BED TO FORM AN ENCLOSURE

[76] Inventors: Jeffrey W. Cook; Lawrence D. Ignelzi, both of 341 Wright St., Lakewood, Colo. 80228

[21] Appl. No.: 940,645

[22] Filed: Sep. 4, 1992

[51] Int. Cl.$^5$ .............................................. B60P 3/32
[52] U.S. Cl. ................................... 296/100; 296/27; 296/159; 296/26; 135/88
[58] Field of Search ............... 296/159, 100, 27, 26; 135/88

[56] References Cited

U.S. PATENT DOCUMENTS

| | | | |
|---|---|---|---|
| 3,367,347 | 2/1968 | Smith | 296/100 |
| 4,332,265 | 6/1982 | Baker | 296/159 |
| 4,652,040 | 3/1987 | Mahan | 296/159 |
| 4,709,956 | 12/1987 | Bowman | 296/100 |
| 4,813,734 | 3/1989 | Hoover | 296/100 |

*Primary Examiner*—Robert R. Song
*Attorney, Agent, or Firm*—Timothy J. Martin; Dana S. Rewoldt

[57] ABSTRACT

A covering assembly adapted for use over a bed of a vehicle comprises a cover having sleeve structures extending longitudinally along opposite lateral edges of the cover and on opposite side walls of the vehicle, a pair of tension rod members and a plurality of tie-down devices. Each sleeve structure receives one tension rod member and the plurality of tie-down devices interconnects the tension rod members to the pickup truck so that the cover can maintain a taut condition over the bed of the vehicle. The covering assembly also includes a frame assembly and a plurality of insert adapters. The insert adapters are mounted into pre-existing stake pockets of the vehicle and the frame assembly is supported by the mounted insert adapters. A substitute cover is adapted to be positioned over the frame assembly to form a tent structure over the bed of the vehicle.

22 Claims, 11 Drawing Sheets

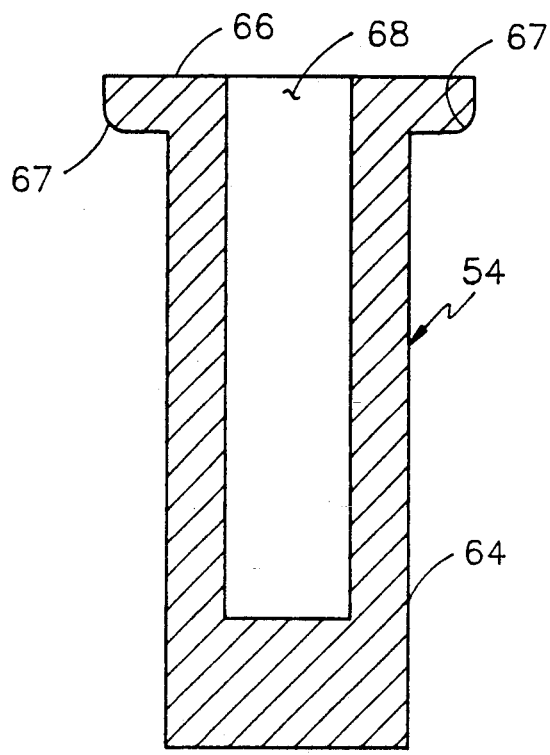
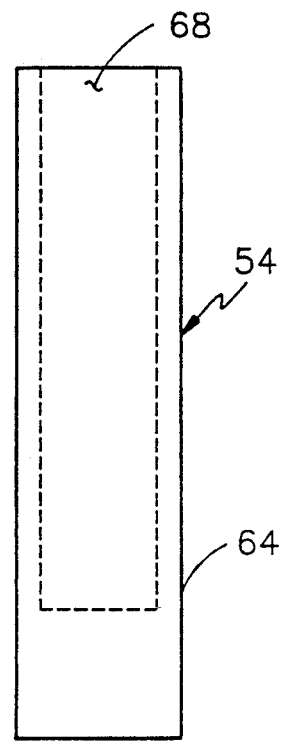
FIG.6A  FIG.6B
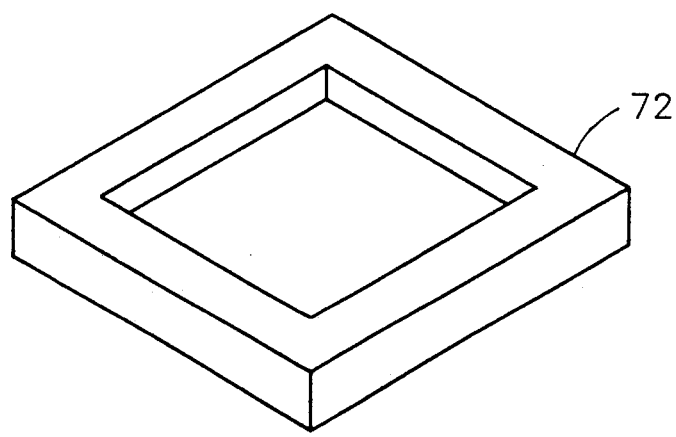
FIG.7

COVER ASSEMBLY FOR USE ON A VEHICLE BED TO FORM AN ENCLOSURE

FIELD OF THE INVENTION

The present invention relates generally to a covering assembly adapted for use in conjunction with the bed of a vehicle in order to enclose a protected space. This invention is particularly directed to a covering assembly adapted for erection over the bed of a pickup truck or any other vehicle having a bed in order to form a cargo cover or a tent structure.

BACKGROUND OF THE INVENTION

Typically, pickup trucks and other vehicles are sold and used with the decks of the beds exposed to the exterior environment. During adverse weather conditions, it would not be wise to transport some types of cargo, in the open bed of the pickup truck because damage to the cargo might occur. For this reason, some vehicles and trailers have enclosed compartments for the transport of cargo. While this is effective in protecting the cargo, such construction defeats the versatility of a pickup truck. Accordingly, one solution to the problem of protecting cargo transported by a pickup truck is to cover the cargo with a tarp. However, when driving the pickup truck, wind causes these tarps to flutter. Not only is this annoying to the occupants of the pickup truck but also the tarp could potentially disengage from the pickup truck. By making modifications to the pickup truck, tie-down fasteners can be used to better secure the tarp in a manner to limit the amount of the flutter. Also, hard-shell tops could be installed over the opened bed to protect the cargo from adverse weather conditions but, as mentioned below, these have inherent disadvantages.

In addition to transporting cargo, pickup trucks are also used for recreational activities such as camping. It should be understood that a vehicle mounted tent can sometimes be similar to a cargo protecting covering, except that a tent structure employs an integrated framework in conjunction with the vehicle bed in order to form a protected space of size suitable for temporary occupancy and shelter. Many pickup truck owners who enjoy camping have converted their pickup trucks either temporarily or permanently to campers. Several types of conversions are readily commercially available to pickup truck owners who desire to convert their pickup trucks to campers. A more permanent conversion would be a self-contained camper unit which is mounted into the bed of the pickup truck. Usually, these camper units come completely equipped with a small appliances such as sink, a propane stove and refrigerator as well as two bunks and a toilet. Temporary conversions would include a hard-shell camper top or a tent structure to cover the bed of the pickup truck thereby protecting the occupants from adverse weather conditions. These temporary conversions are more desirable if the pickup truck is required for work-related or other uses.

The hard-shell camper top has inherent disadvantages. The hard-shell camper top is heavy. This causes hardship in mounting it to and dismounting it from the bed of the pickup truck. Extreme care must be taken when mounting the hard-shell camper shell on the bed of the pickup truck. If improperly mounted, the camper shell could detach from the pickup truck. If the pickup truck is in motion at the time when the camper shell detaches, the camper shell could cause bodily harm and property damage. Further, transporting a heavy hard-shell camper top reduces fuel economy of the truck and, therefore, a cost penalty is associated with employing one. The hard-shell camper top is bulky and, as a result, storing it presents an inconvenience problem and a storage space problem. Lastly, it is simply not very practical to remove the camper shell from the truck unless it would be near its place of storage.

To overcome the inherent disadvantages of employing a hard-shell camper top, many types of tent structures for pickup trucks have been developed. One example of a prior art tent structure is shown in U.S. Pat. No. 4,652,040 issued on Mar. 24, 1987, to Mahan. This tent arrangement for a pickup truck utilizes a tailgate envelope which secures the tent to the lowered tailgate. Although this envelope extends the living space inside of the tent, it does require an occupant to either step or kneel on the envelope before entry into the tent. Stepping or kneeling on the envelope can damage the tent structure and subsequently decrease its useful life. This problem could be circumvented by providing a stairway leading to the entrance of the tent.

Another prior art tent structure is disclosed in U.S. Pat. No. 4,332,265 issued on Jun. 1, 1982, to Baker. This tent structure requires assembling a frame comprising numerous elongated tubular elements. The frame is secured into the bed of the pickup truck by sliding a tubular element over spatially-disposed bed studs that are incorporated as fixtures into the bed of the pickup truck. Assembling these tubular elements consumes time and these bed-stud fixtures occupy space that otherwise could be more effectively used by the occupants. Modifications must be made to the pickup truck to facilitate the attachment of these fixtures.

U.S. Pat. No. 4,915,440 issued on Apr. 10, 1990, to Daniel et al discloses a truck bed cover for pickups that could be used by campers. A frame has telescopic legs that could be raised or lowered to adjust the height of the truck bed cover for various sizes of cargo. This frame must be rigidly attached to the inside of the bed by fastening fixtures therein. The telescopic legs of the frame are complex mechanisms and would appear to be expensive to manufacture. In U.S. Pat. No. 4,813,734 issued on Mar. 21, 1989 to Hoover, a flexible cover is draped over a frame comprising numerous interconnected tubes. This frame is placed onto the side walls of the truck and a single elastic cord extending around the peripheral edge of the cover attaches to the truck to help secure the tent structure onto the pickup truck. The legs of the frame require specialized shaping so that the frame can be properly placed onto the side walls of the pickup truck. U.S. Pat. No. 5,054,841 issued on Oct. 8, 1991 to Zalman teaches a tent structure made from heavy-duty vinyl having fixed clear vinyl windows and a zippered opening in the rear. The vinyl is sewn to fit a three piece pipe frame that slides vertically into inserts mounted into the bed of the pickup truck.

Numerous other types of tent structures or other types of covering assemblies for pickup trucks are known in the art but are not considered to be relevant prior art because none of these prior art tent structures reflects the characteristics of the present making any modifications and/or permanent attachment to the pickup truck. Also, the components of the covering assembly of the present invention can be compactly stowed. It is from these needs, among others, that the present invention has evolved.

SUMMARY OF THE INVENTION

It is an object of the present invention to provide a new and useful protective covering for pickup trucks or other such vehicles that is an improvement over existing types of coverings which mount over truck beds to enclose a protected space either for cargo or for shelter.

It is yet another object of the present invention to provide such a covering assembly which can be easily and rapidly erected as well as easily and rapidly dismantled.

It is yet a further object of the present invention to provide such a covering assembly that can be compactly stowed.

A further object of the present invention is to provide such a covering assembly which can be easily and rapidly secured to the pickup truck or vehicle without making modifications and/or permanent attachments thereto.

Yet another object of the present invention is to provide a covering assembly that provides a better fit to cooperate with the truck to form a relatively waterproof camping compartment.

A still further object of the present invention is to provide such a covering assembly that is inexpensive to manufacture.

A still further object of the present invention is to provide such a covering assembly that can be configured to form a tent structure for erecting over the bed of a vehicle.

A still further object of the present invention is to provide a covering assembly having a simple frame assembly which can be easily and rapidly adapted to pre-existing stake pockets formed in the side walls of the pickup truck or vehicle without making any modifications thereto.

Another object of the present invention is to provide such a covering assembly having a cover which can be easily and rapidly draped over the frame assembly mounted across the bed of the pickup truck.

Accordingly, then, the present invention is directed to a covering assembly which is adapted for use with a vehicle wherein the vehicle has a bed defined by a bed and opposed sidewalls. The covering assembly includes a cover which is formed of a flexible material so that it has a central cover portion adapted to be positioned over the bed of the vehicle in spaced relation across the deck between the sidewalls. The cover also has a pair of retaining edge portions located on opposite lateral sides of the central cover portion so that each of the retaining edge portions may extend downwardly along the sidewalls of the vehicle bed to terminate in a retaining edge. A tensioning rod member is associated with each of the retaining edge portions so that it may extend along and be supported by the retaining edge portion. A fastening device is then associated with each tensioning rod member and, when used, interconnects the tensioning rod member to an anchor portion on the vehicle so that a tensioning force may be applied first to the tensioning rod member and thereby to the opposite lateral sides of the central cover portion. In this manner, the cover is maintained in a taut condition when the cover is in a secured state on the bed.

In one form of the invention, the covering assembly is in the form of a tent structure. To this end, a frame assembly may be included with this frame assembly being made of a plurality of truss members that are U-shaped in configuration so that they are oriented in an arcuate manner across the bed of the vehicle, for example, in parallel vertical planes. Further, where the vehicle, such as a pickup truck, has a bed that includes stake pockets that are formed in the sidewalls, a plurality of insert adapters may be used to receive the ends of the trusses and mount the trusses into the stake pockets so that the trusses thereby become secured to the sidewalls. The adapters may each have an elongated body with a longitudinal bore to receive a truss end. A flange is provided to position the adapter in the respective stake pocket, and a protective, resilient gasket may be used around the flange.

Furthermore, a front cover portion and a rear cover portion may be employed as an extension of the central cover portion so that the cover also extends downwardly and forwardly of the bed and rearwardly and downwardly of the bed. Retaining edge portions may terminate in a sleeve structure that is sized to receive a respective tensioning rod, and the fastening devices can be elastic elements including hook members that are interconnected by an elastic cord. A rear seal may be used to retain a lower edge of the rear cover portion in position adjacent the deck. This may be a sleeve, retaining rod and strap assembly. If desired, a door and windows may be provided.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the invention concepts contained herein.

BRIEF DESCRIPTION OF THE DRAWINGS

Other objects, advantages and capabilities of the present invention will become more apparent as the description proceeds, taken in conjunction with the accompanying drawings, in which:

FIGS. 6A and 6B are respectively a cross-sectional front view and an elevational side view of the insert adapter shown in FIG. 5;

FIG. 7 is a perspective view of a pad shown in FIG. 5;

DESCRIPTION OF THE PREFERRED EMBODIMENT

Figure 1:
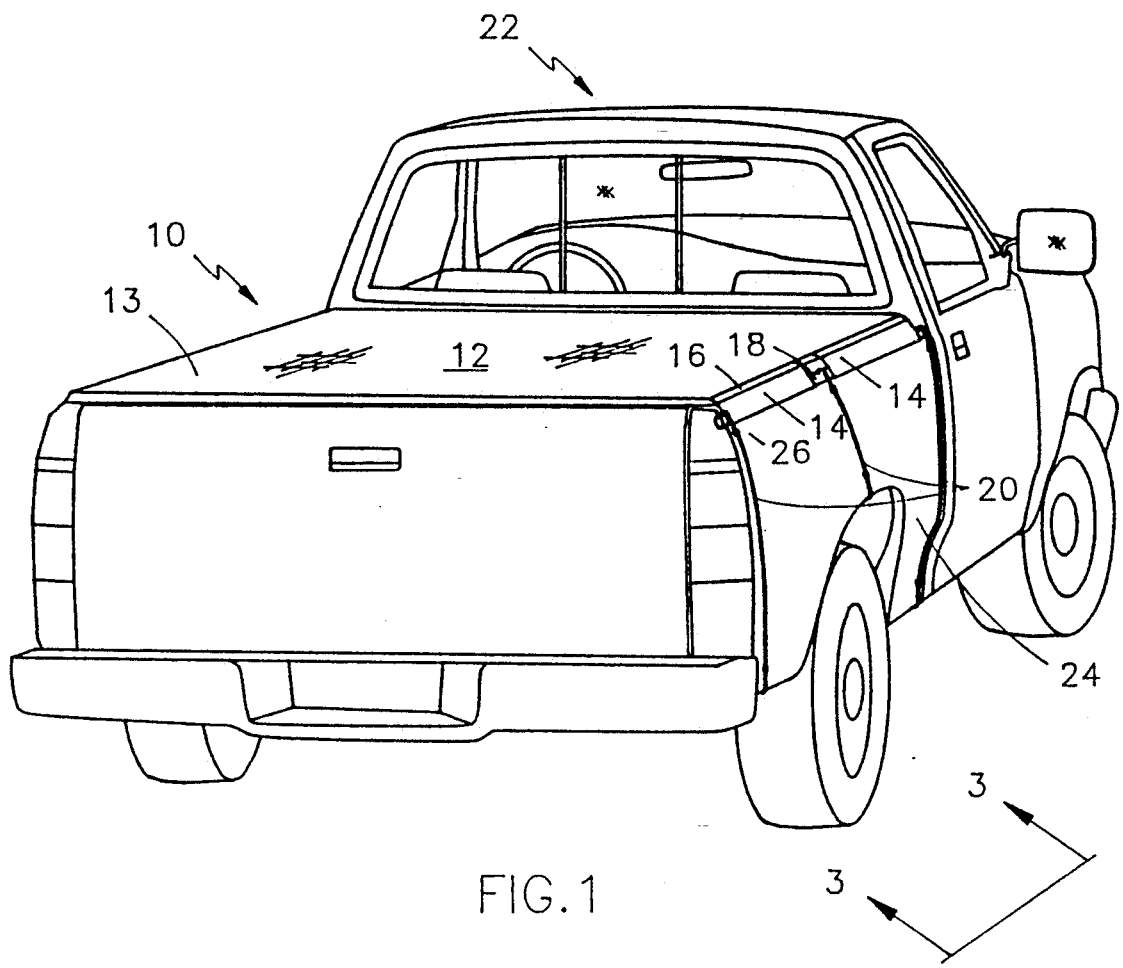
FIG. 1 is a perspective view showing an exemplary embodiment of the present invention constructed as a covering assembly operatively in use over a bed of a pickup truck which can either be used as a cargo cover or as a frameless tent.
Figure 2:
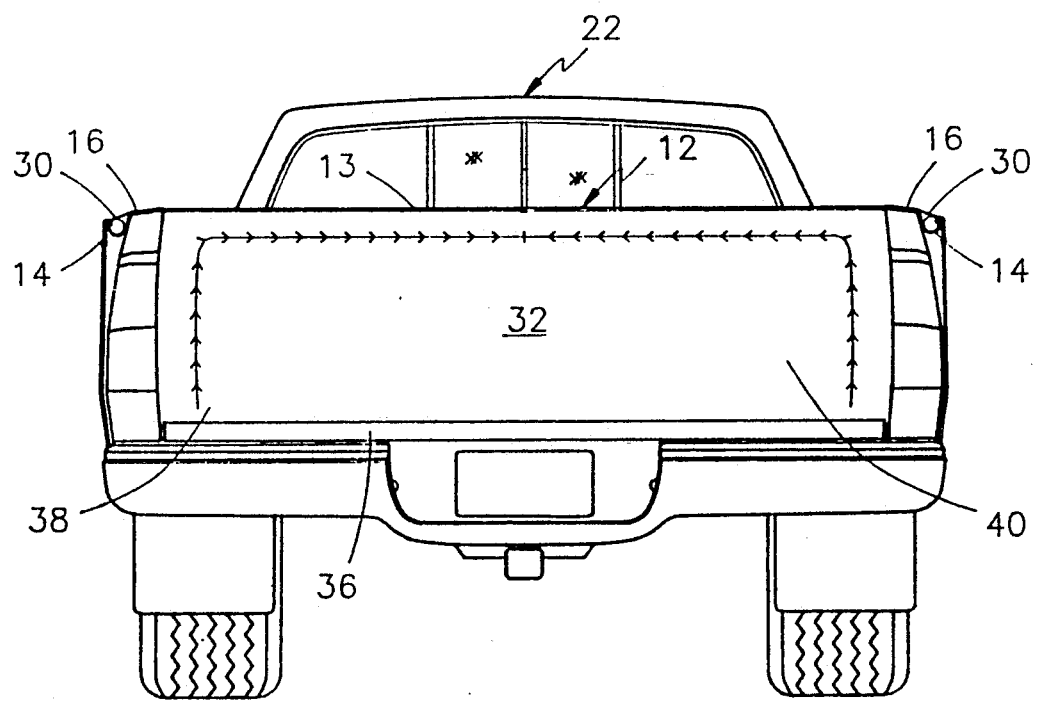
FIG. 2 is a rear elevational view showing the covering assembly operatively in use over the bed of the pickup truck shown in FIG. 1.
Figure 3:
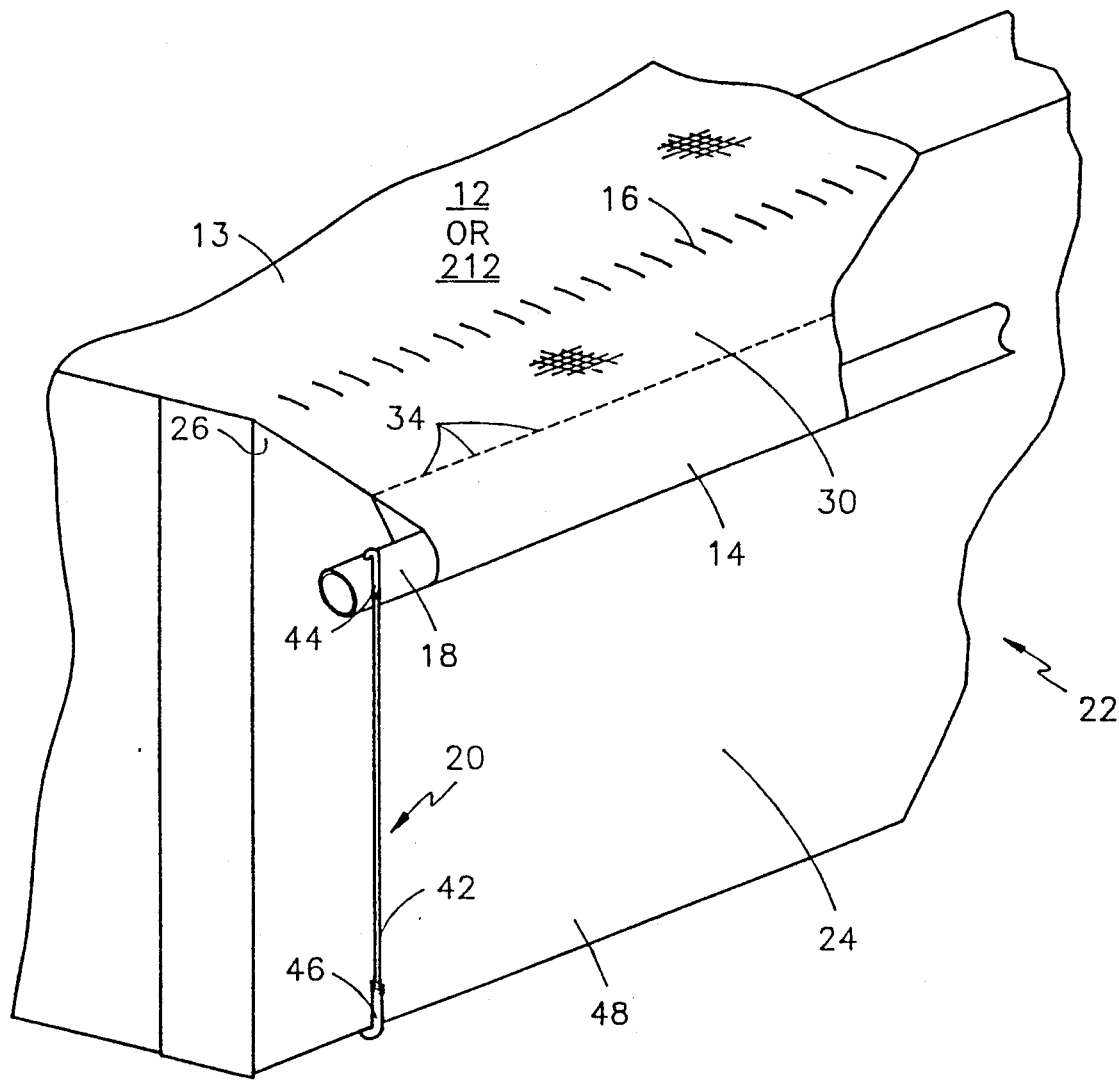
FIG. 3 is an enlarged, fragmentary perspective view of a cover having a sleeve structure, a tensioning rod member and fastening device of the present invention taken generally from the orientation of line 3—3 in FIG. 1.

With reference then to FIGS. 1-3, a first exemplary embodiment of the present invention is shown in the form of a covering assembly 10 which extends over a bed of a conventional pickup truck 22. Cover assembly 10 includes a cover 12 formed by a sleeve structure 14 extending longitudinally along opposite lateral edges 16 of central cover portion 13. A pair of tensioning rod members, such as rod members 18 is received in each oppositely-disposed sleeve structure 14, and a plurality of fastening devices 20 interconnects each tensioning rod members 18 to an anchor portion of the pickup truck 22 so that the cover 12 can be held in a taut condition over the bed of the pickup truck 22. Here, for purposes of this description of the preferred embodiment of the present invention, the bed of the pickup truck 22 is defined by its longitudinally extending deck and a pair of side walls 24 which are located on opposite lateral sides of the deck and extend upwardly from the deck to form an interior of the bed. Each side wall 24 has an upper side wall edge 26 which establishes an upper boundary of the bed.

Cover 12 and edge retaining portions 30 are formed from any flexible material typically used in the tent construction industry. Such material typically has the characteristics of being water-resistant and fire-resistant. Examples of this material include nylon, canvas, vinyl reinforced polyester or the like which could be sewn and yet withstand the severe weather conditions that could be incurred during a camp outing. The cover 12 is fabricated by construction techniques which are standard in the tentmaking industry. With reference to FIGS. 1 and 2, the cover 12 of the covering assembly 10 includes central cover portion 13, a pair of oppositely-disposed retaining edge portions 30 and a rear cover portion 32. The central cover portion 28 is adapted to be positioned over the bed of the pickup truck 22 so that it extends in spaced relation across the deck between the upper side walls edges 26 of the side walls 24. The retaining edge portions 30 are integrally attached along the opposite lateral edges 16 of the central cover portion 13 and are adapted to extend downwardly alongside respective upper side wall edges 26 as best shown in FIGS. 2 and 3. Each of the retaining edge portions 30 is folded and an attachment seam 34 is sewn therealong to form the sleeve structures 14. Thus, each retaining edge portion 30 of the cover 12 terminates in one of the sleeve structures 14. As best shown in FIG. 2, pickup truck 22 includes a tailgate 36 which is shown in its opened, horizontal position; here, the rear cover portion 32 is shown to extend laterally across and downwardly from the central cover portion portion 28 extends downwardly into a trough formed between the deck and the tailgate 36 of the pickup truck 22. Thus, the cover 12 encloses the interior of the bed to form a protected space therein. For ingress into or egress from the enclosed interior, a person could unzip a door portion 40 of the rear cover portion 32 which door construction is of a standard type known in the tent construction art.

As best shown in FIG. 3, each sleeve structure 14 slidably receives a tensioning rod member 18. As a result, the tensioning rod members 18 can be easily slidably inserted into or easily slidably withdrawn from the sleeve structures 14. The tensioning rod member 18 shown in FIGS. 1, 2 and 3 is an elongated hollow tube. The shape of the tensioning rod member 18 could be rectangular, square or any other shape and that the tensioning rod member 18 could be solid or hollow. The tensioning rod members 18 could be made of any rigid material such as plastic, metal, wood or the like and, if desired, could be formed by a plurality of joinable tube sections.

The fastening device 20, as best seen in FIG. 3, comprises a flexible cord 42 and two hooks 44 and 46 fixably attached to each of the opposite end portions of the cord 42. The flexible cord 42 could be made of rubber or some other type of elastic material such as that known as a "bungee cord." The purpose of the fastening device 20 is to interconnect the tensioning rod members 18 with an anchor portion 48 of the pickup truck 22 so that the cover 12 can be maintained in a secured state on the bed of the pickup truck 22. The first hook 44 is releasably attached to the tensioning rod member 18 while the other second hook 46 is releasably attached to the anchor portion 48 of the pickup truck 20 which could be a lower edge (shown as 48) of the side walls 22 or some other component of the pickup truck. The first hook 44 is inserted into an attachment hole which extends radially through the tensioning rod member 18. Alternatively, the first hook 44 could simply be hooked around the tensioning rod member 18. It is preferred that the first hook 44 be inserted into the attachment hole since this helps prevent scratching the side wall 24 if the secured covering assembly 10 is moved or otherwise jostled. Further, it is desirable that the first hook 44 remains in the attachment hole so that it cannot be inadvertently slid along the tensioning rod member 18. The second hook 46 can be attached to the anchor portion 48 of the pickup truck 22. It is intended that the second hook 46 can be releasably attached to the anchor portion 48 of the pickup truck 22 as one would normally employ a hook. The cord 42 must be sized in a manner so that after both hooks 44 and 46 are attached, the cord 42 remains in a stretched condition. In this stretched condition, the cords 42 produce tensioning forces which are applied to the tensioning rod members 18 which, in turn, apply these tensioning forces to the opposite retaining edge portions 30. It is these tensioning forces that maintain the cover 12 in a taut condition when the cover is in a secured state over the bed. Naturally, other types of fastening devices could be used, such as ropes, cords, web belts, etc., although some degree of adjustability is desirable.

Figure 4:
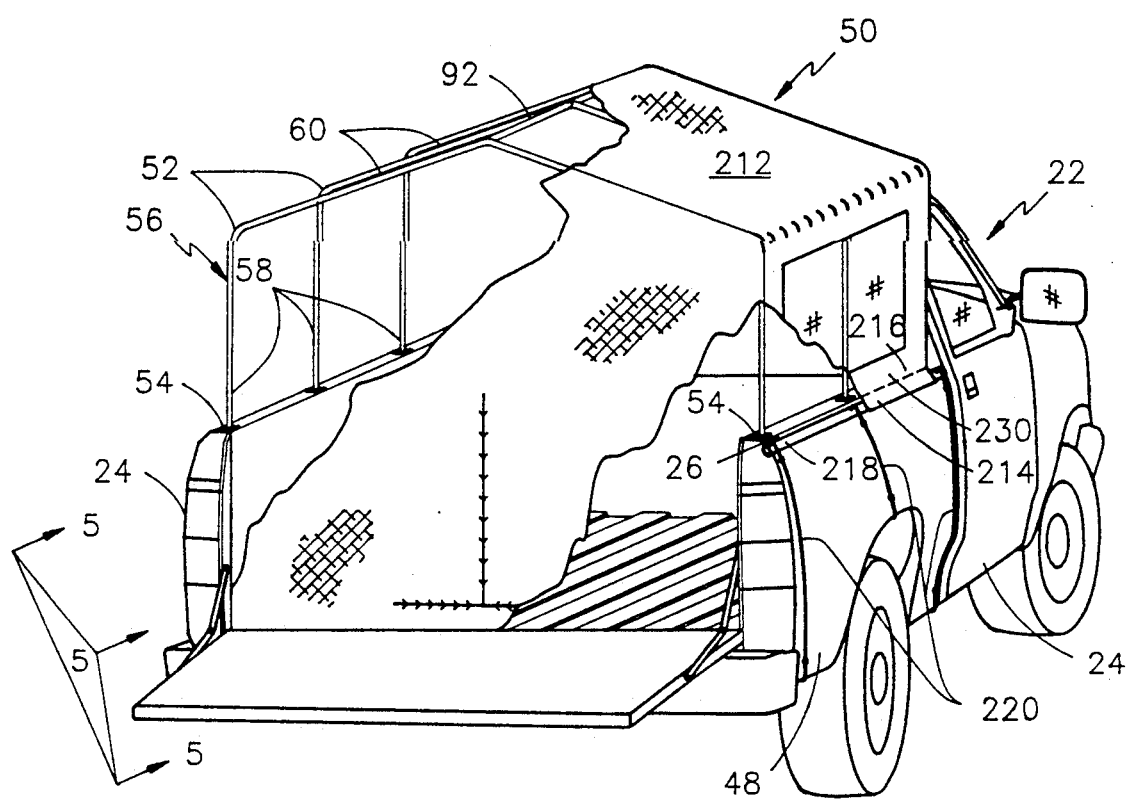
FIG. 4 is a perspective view of an alternative embodiment of the present invention formed as a framed tent structure for a pickup truck according to the present invention.

The covering assembly 10 as described above can be modified into a tent structure 50 for use over the bed of the pickup truck 22 as shown in FIG. 4. Operatively in use, the tent structure 50 extends over the bed of the pickup truck 22 to enclose the interior of the bed to form a protected space. The tent structure 50 adapted to be erected over a bed of the pickup truck 22 comprises a cover 212 having sleeve structure 214 extending longitudinally along opposite lateral edges 216 of the cover 212, a pair of tensioning rod members 218, a plurality of fastening devices 220, a frame assembly 52 and a plurality of insert adapters 54. One insert adapter 54 is slidably inserted into each pre-existing stake pocket found in the side walls 24 of the pickup truck 22. The frame assembly 52 comprises at least two trusses 56. Each truss 56 is adapted to have free ends that may be slidably inserted into a pair of insert adapters 54 spatially opposed in opposite side walls 24 and forms an arch across the bed in a substantially vertical plane. The cover 212 is sized to configure to the frame assembly 52 and is adapted to be positioned over the bed to enclose the interior to form a protected space. Each sleeve structure 214 slidably receives one tensioning rod member 218. At least one fastening device 220 associated with each tensioning rod member 218 interconnects the tensioning rod members 218 to the anchor portion 48 of the pickup truck 22 so that a tension force can be applied to the maintain the cover 212 in a taut condition over the bed when the cover 212 is in a secured state.

Figure 5:
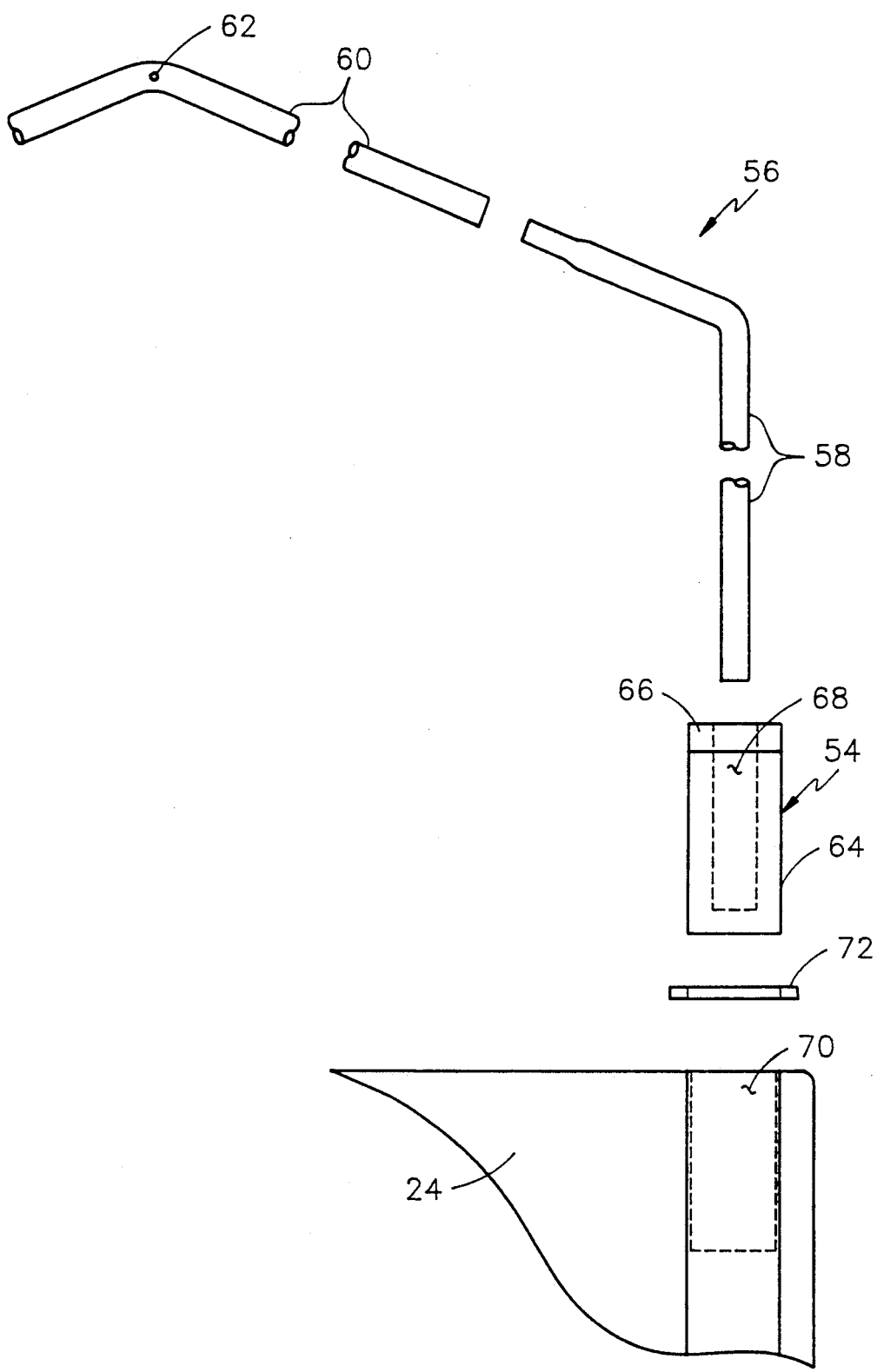
FIG. 5 is an end view in elevation of a framework element used for the tent structure of FIG. 4 showing an insert adapter and a pad for insertion into the stake pocket in the sidewall of a pickup truck.

As shown in FIG. 4, the frame assembly 52 comprises three trusses 56. These three trusses 56 are adapted to the side walls 24 of the pickup truck 22. However, it is possible that only two trusses 56 could be adapted to the side walls 24 of the pickup truck 22. Although the trusses 56 could be any shape, either hollow or solid or made from any material, it is preferred that the trusses 56 be constructed from aluminum, zinc or powder-coated steel tubing. In any event, it is preferred that each truss 56 is configured as an inverted U-shape and comprises two leg segments 58 (only one of two is shown) and a rafter segment 60. In FIGS. 4 and 5, the upper portion of each leg segment 58 projects at an obtuse angle with respect to its respective rafter segment 60. The center portion of the rafter segment 60 is bent at an angle so that connecting the leg segments 58 to the rafter segment 60 forms the truss 56 having an inverted U-shape. The center portion of the rafter segment 60 contains a receiving hole 62 which extends substantially horizontally through the rafter segment 60. The connection made between each leg segment 58 and the rafter segment 60 is common in the tentmaking industry and is typically referred to as a "swaged connection" or "swaged fitting". Thus, the truss 56 can be easily assembled for use or easily dismantled into its three components for storage.

For assembly of the tent structure 50 over the bed of the pickup truck 22, a lower free end portion of each leg segment 58 of the trusses 56 is slidably inserted into the insert adapter 54 as shown in FIG. 5. The insert adapter 54 is illustrated in FIGS. 5, 6A and 6B. The insert adapter 54 includes an elongated, rigid body member 64 extending longitudinally and a flange 66 rigidly attached to a top portion of the elongated body member 64 and circumferentially extends therearound. Flanges 66 have rounded corners 67 so that each insert adapter 54 may rock slightly when in use to accommodate slight variations in the configuration of the vehicle's sidewalls and stake pockets. Commencing at the flange portion of the insert adapter 54, an insert hole 68 extends substantially longitudinally through the elongated body member 64. The purpose of the insert hole 68 is to receive the lower portion of the leg segment 58 of the truss 56 so that the leg segment 58 can be slidably inserted into and slidably removed from the insert rigid material. Furthermore, making any minor modifications to the shape of the insert adapter 54 would not be considered a departure from the inventive concepts inherent in the present invention. As best shown in FIG. 5, the insert adapter 54 is adapted to be slidably inserted and slidably removed from a pre-existing stake pocket 70 which is incorporated into the side walls 24 of the pickup truck 22. The shape of the insert adapter 54 would be such that it can be slidably and removably inserted into the stake pocket 70 while simultaneously providing a rather tight fit when positioned therein. The flange 66 prevents the elongated body member 64 from falling into the pre-existing stake pocket 70 by providing a contact surface for the insert adapter 54 to rest on the side walls 24. If desired, an optional pliable pad 72 shown in FIGS. 5 and 7 made from rubber or similar material is placed between the side wall 24 and the flange 66 of the insert adapter 54. This prevents scratching of the painted side wall 34 and also cooperates with the upward divergence of segments 58 of each truss 56 to place tension on cover 12.

The pre-existing stake pockets 70 are incorporated into the side walls 24 of the pickup truck 22 by the manufacturer. Usually, six stake pockets 70 are provided with two stake pockets 70 in the front portion of each side wall 24, with two stake pockets 70 in the center portion of each side wall 24 and with two stake pockets 70 in each rear portion of each side wall 24. This arrangement of stake pockets 70 constitute a spatially-opposed front pair of stake pockets 70, a spatially-opposed central pair of stake pockets 70 and a spatially-opposed rear pair of stake pockets 70. It is possible, however, that another manufacturer might provide only the spatially-opposed front pair and spatially-opposed rear pair of stake pockets 70.

Once each insert adapter 54 is placed into each of the stake pockets 70, the assembled trusses 56 can be removably adapted over the bed of the pickup truck 22 as shown in FIG. 4. The lower portions of the leg segments 58 of each truss 56 are slidably inserted into two insert adapters 54 which are disposed in each spatially-opposed pair of stake pockets 70. After the three trusses 56 are slidably inserted into their respective insert adapters 54, the end result is the mounting of three inverted tially parallel vertical planes. It should be understood, though, that other frameworks are within the scope of this invention; for example, it would be possible to utilize crisscrossing U-shaped trusses of the type employed in dome tent structures.

After the three inverted U-shaped trusses 56 are mounted onto the pickup truck 22, the cover 212 can be draped over the frame assembly 52. The trusses 56 now being disposed under the cover 212 support the cover 212 above the bed of the pickup truck 22. As noted, the cover 212 could be fabricated from any conventional flexible material typically used in the tent industry, and the cover 212 may be fabricated by construction techniques which are standard in the tent-making industry. Further, the cover 212 includes typical features such as doors, zippers and windows that are also standard in the tent-making industry. Therefore, only a brief explanation will ensue regarding fabrication and construction of this cover 212 because one of ordinary skill in the art should already appreciate the knowledge and skill associated with tent construction.

Figure 8:
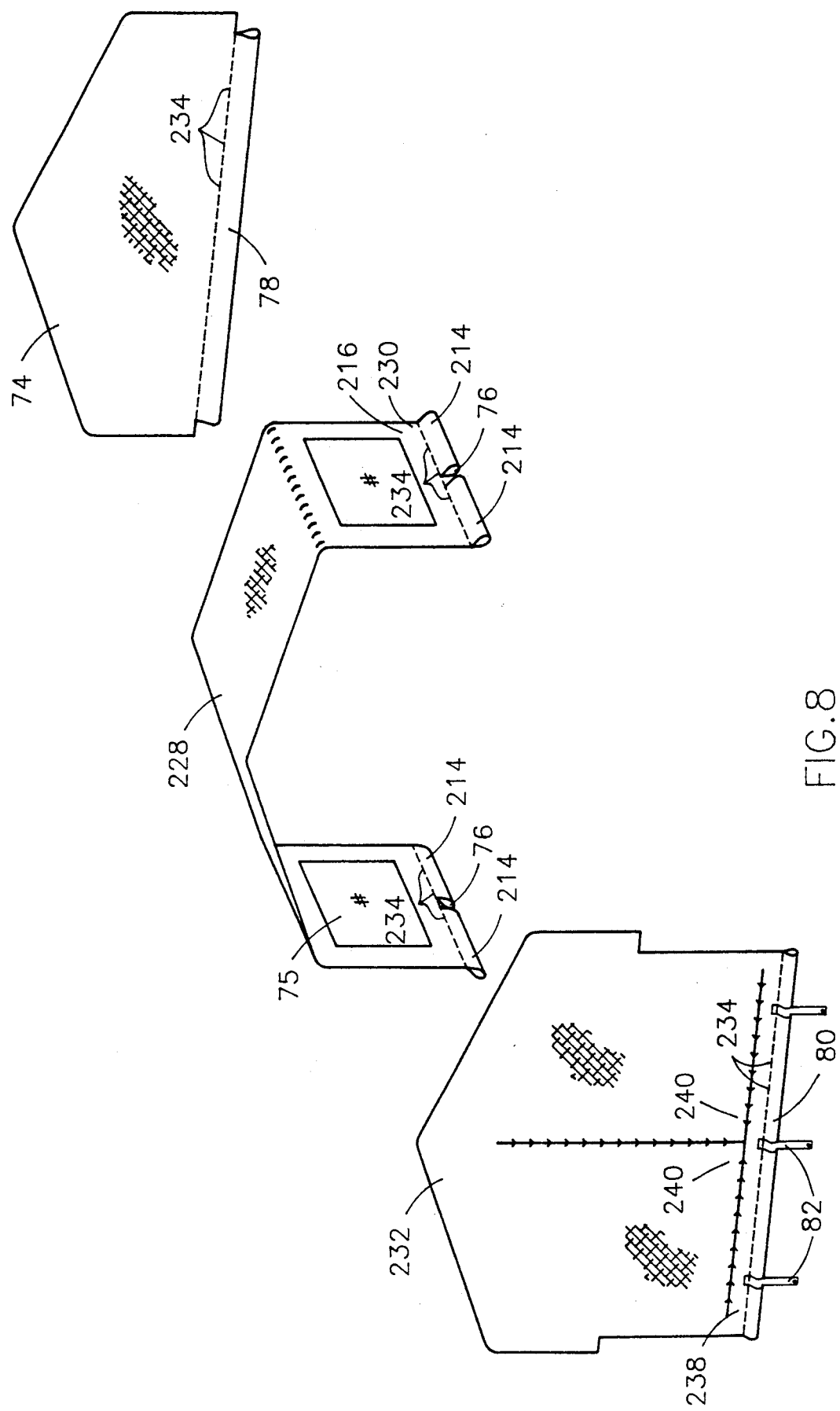
FIG. 8 is an exploded perspective view of three cover portions to be assembled into the cover shown in FIG. 4.

As shown in FIG. 8, the cover 212 includes a central cover portion 228, a front cover portion 74 and a rear cover portion 232. The central cover portion 228 is that portion of the cover 212 that drapes over and configures to the frame assembly 52. The central cover portion 228 has a standard side window 75 incorporated into it for circulation of fresh air into the camper compartment while simultaneously preventing insects from entering thereinto. A retaining edge portion 230 is integrally attached along each lateral edge 216 of the central cover portion 228. The retaining edge portion 230 of the central cover portion 228 is folded and an attachment seam 234 is sewn along the fold to form sleeve structures 214. At approximately the center portion of each sleeve structure 214, a notch 76 is formed into the sleeve structures 214 for reasons discussed hereinbelow. The front cover portion 74 includes a front cover sleeve structure 78 which is sewn by the attachment seam 234 laterally across the lower portion of the front cover portion 74. The rear cover portion 232 includes two zippered door portions 240 for ingress into and egress out of the camper compartment and a threshold portion 238. The threshold portion 238 extending laterally across the lower portion of the rear cover portion 232 is folded and an attachment seam 234 is sewn along the fold to form a rear cover sleeve structure 80. Also attached along the sewn fold of the threshold portion 238 is a plurality of straps 82 which hang downwardly over the rear cover sleeve structure 80.

As best shown in FIG. 4, the central cover portion 228 is sewn transversely with an attachement seam (not shown) to both the front cover portion 74 and rear cover portion 232 to form the cover 212. The front cover portion 74 and the rear cover portion 232 can be considered to extend throughout imaginary vertical planes which are transverse to the central cover portion 228. The cover 212 is draped over the frame assembly 52 in a manner as generally shown in FIG. 4 whereby the cover 212 configures to the frame structures 56 which are now mounted to the pickup truck 22. The central cover portion 228 is sized to be positioned over the bed so that the cover 212 extends in spaced relation across the deck of the pickup truck 22 between the side walls 24. Each retaining edge portion 230 of the cover 212 is integrally attached to the lateral edges 216 of the central cover portion 228 such that each retaining edge portion 230 extends downwardly alongside a respective one of the upper side wall edges 26 exteriorly of the bed as shown in FIGS. 4 and 9.

Figure 9:
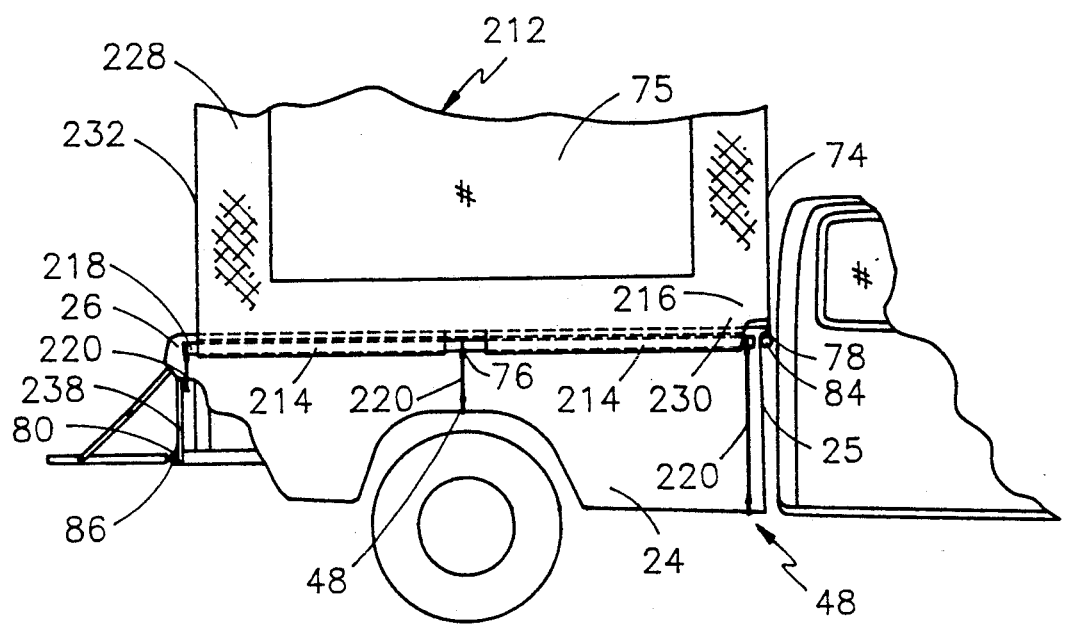
FIG. 9 is a fragmentary side elevational view of the tent structure in FIG. 4 showing the cover mounted over the frame structures and the rear portion having a rear portion sleeve structure with a lateral rod retaining member positioned therein.

As best shown in FIG. 9, each sleeve structure 214 slidably receives one tensioning rod member 218. Now, each tensioning rod member 218 can be slidably inserted into or slidably removed from the sleeve structure 214. For the preferred embodiment of the present invention, attachment holes (not numbered) are formed radially into the tensioning rod member 218 at its center portion and opposite end portions. The end portions of the tensioning rod members 218 extend beyond the sleeve structures 214. Correspondingly, the center portion of the tensioning rod member 218 is positioned within the center portion of the sleeve structure 214 such that the attachment hole is disposed somewhere within the notch 76. Appropriately installing each tensioning rod member 218 within each sleeve structure 214 facilitates the ease of interconnecting the cover 212 to the anchor portion 48 of the pickup truck 22.

Figure 10:
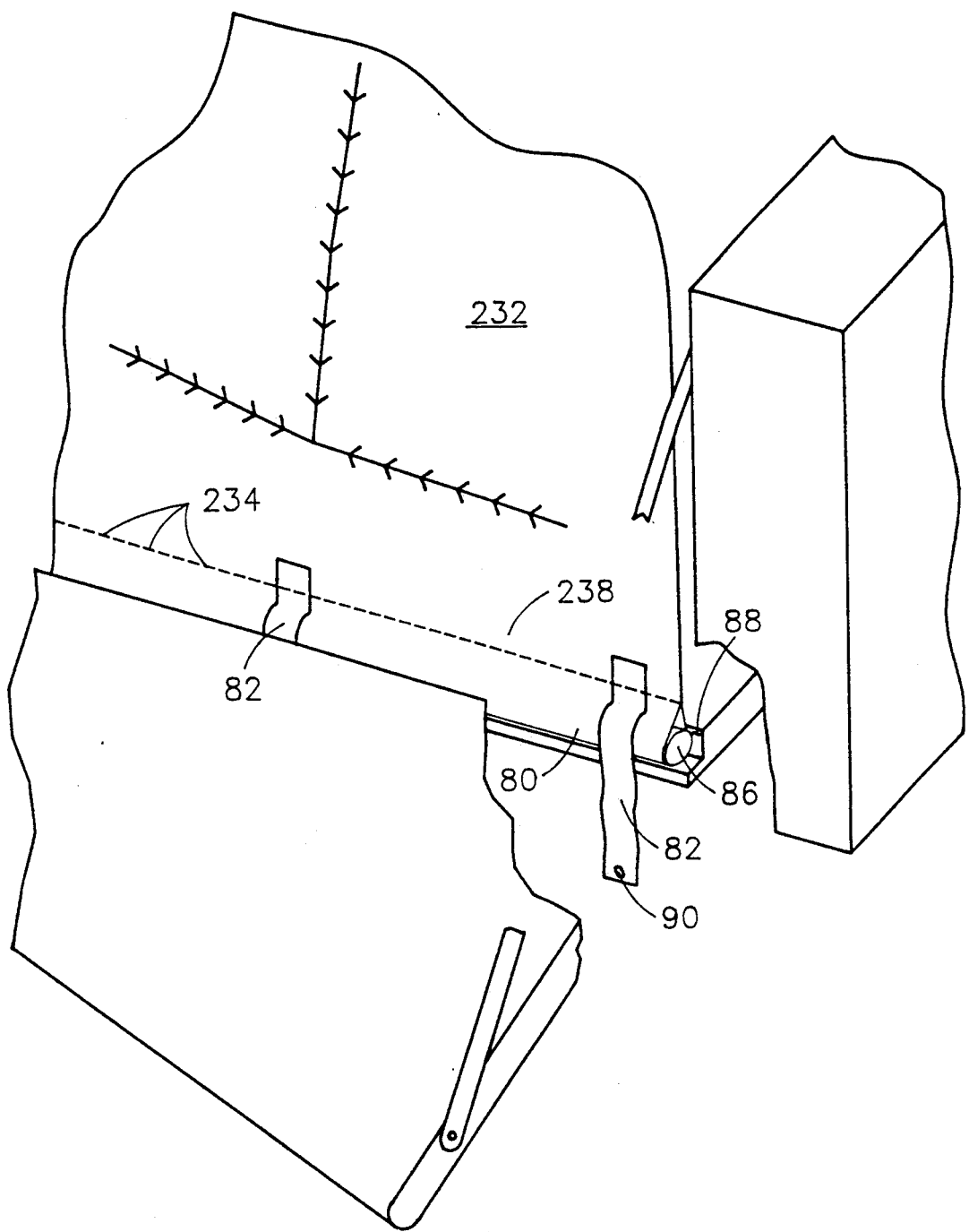
FIG. 10 is a fragmentary perspective view of the rear cover portion of the cover shown in FIG. 4 having the sleeve and lateral rod retaining member disposed within the trough formed between the tailgate and the deck of the pickup truck.

As best shown in FIG. 9, the front cover sleeve structure 78 of the front cover portion 74 of the cover 212 slidably receives a front tensioning rod member 84. As a result, the front tensioning rod member 84 can be slidably inserted into or slidably removed from the front cover sleeve structure 78. For the preferred embodiment of the present invention, attachment holes (not numbered) are formed radially into the front tensioning rod member 84 at opposite end portions which extend beyond the front cover sleeve structure 78. The front cover portion 74 is sized so that the front cover sleeve structure 78 extends exteriorly of the bed of the pickup truck 22. Similarly, as is shown in FIGS. 9 and 10, the rear cover sleeve structure 80 of the rear cover portion 232 of the cover 212 slidably receives a rear tensioning rod member 86. As a result, the rear tensioning rod member 86 can be slidably inserted into or slidably removed from the rear sleeve structure 80. The rear cover portion 232 is sized so that the rear cover sleeve structure 80 with the rear tensioning rod member 86 enveloped therewithin is disposed within a trough 88 formed between the deck of the pickup truck 22 and the tailgate 36. Any of the tensioning rod members 84, 86 and 218 could be made of any rigid material such as plastic, metal, wood or the like. Further, the tensioning rod members 84, 86 and 218 could be any shape such as rectangular or square and could be either hollow or solid. Shown in FIG. 10, the straps 82 extend downwardly from and attach along the threshold portion 238 of the rear cover portion 238 by the attachment seam 234 that retains the fold of the threshold portion 238 forming the rear cover sleeve structure 80. A strap hole 90 is formed in the end portion of the strap 82 opposite of the end where the strap 92 is sewn to the threshold portion 238. The straps 82 secure the rear cover portion 232 to the pickup truck 22.

As shown in FIG. 9, the fastening devices 220 are employed to secure the cover 212 to the pickup truck. The fastening device 220 are the same as fasteners 20 shown in FIG. 3. The purpose of each fastening device 220 is to again interconnect the tensioning rod member 218 with the anchor portion 48 of the pickup truck 22 so that the cover 212 can be maintained in a secured state on the bed of the pickup truck 22. In this stretched condition, the cords 220 produce tensioning forces which are applied to the tensioning rod members 218 which, in turn, apply these tensioning forces to opposite retaining edge portions 230. It is these tensioning forces that maintain the cover 212 in a taut condition when the cover 212 is in a secured state over the bed. Fastening hole located at each end portion of the front tensioning rod member 84, as best shown in FIG. 9. Also, fastening devices 220 would be releasably attached by engagement with each strap hole 90 of each strap 82 as best shown in FIG. 10. The remaining ends of the fastening devices 220 would be releasably attached to any anchor portion of the pickup truck 22.

Figure 11:
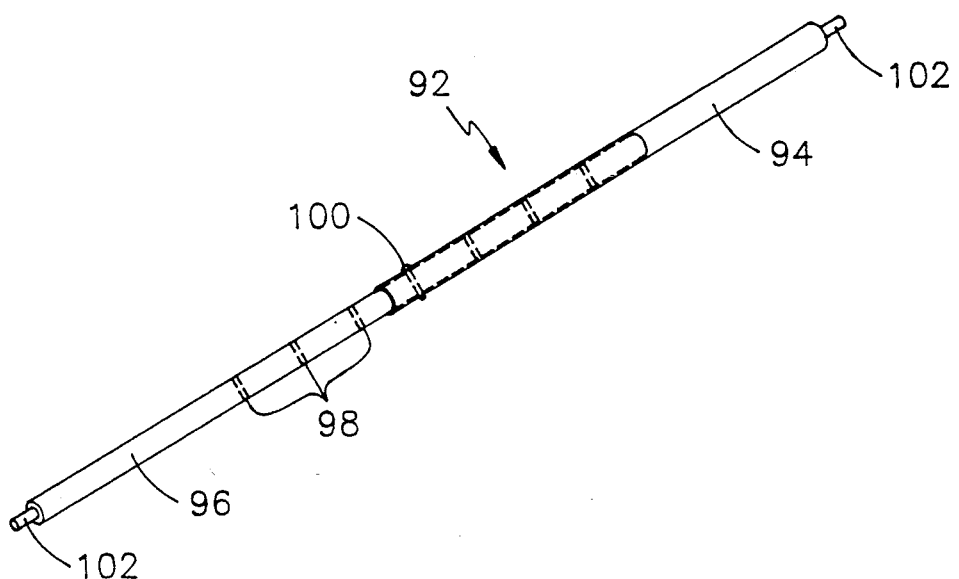
FIG. 11 is a perspective view of the ridgepole assembly shown in FIG. 4.
Figure 12:
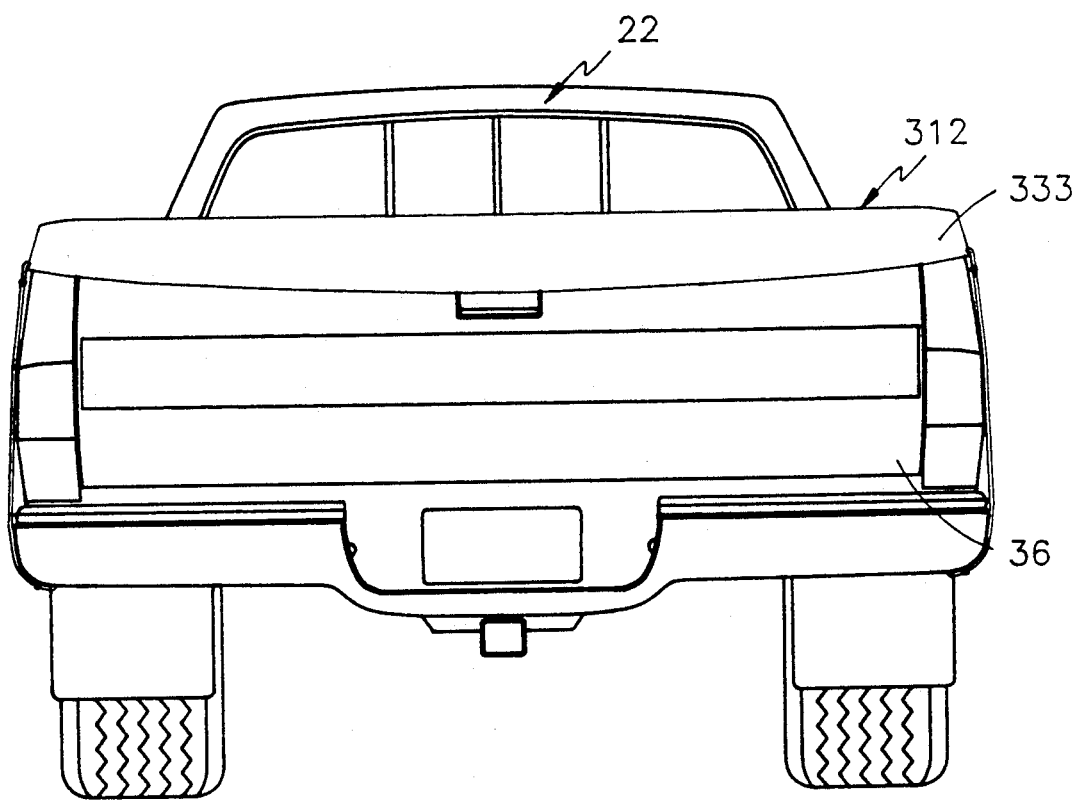
FIG. 12 is a rear elevational view showing a third alternative covering assembly operatively in use over the bed of a pickup truck.
Figure 13:
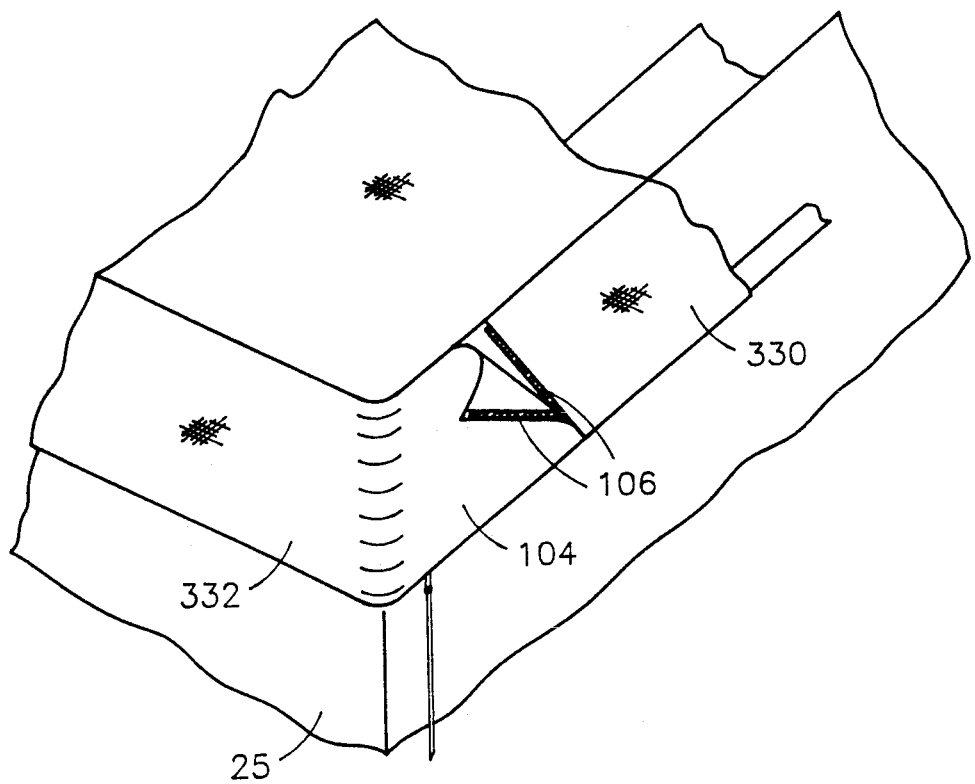
FIG. 13 is a front perspective view of flap portions incorporated with the cover assembly shown in FIG. 12.
Figure 14:
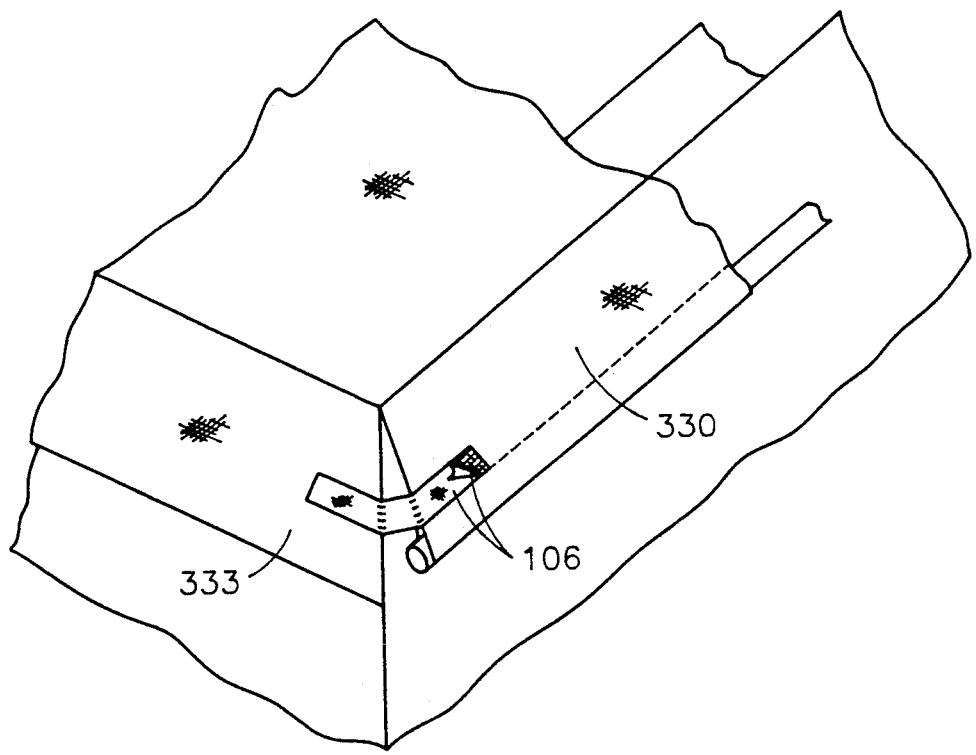
FIG. 14 is a rear perspective view of the attachment of the cover assembly shown in FIG. 12.

With reference to FIGS. 4, 5 and 11, a ridgepole assembly 92 comprises a first hollow tube member 94 containing a pin hole (not numbered), a second tube member 96 containing a plurality of adjustment holes 98, a pin 100 and two finger members 102. At the inner ends, the first hollow tube member 94 telescopically receives the second tube member 96. At outer ends, the two finger members 102 are welded or are otherwise fixably attached along the longitudinal axis of the ridgepole assembly 92 onto both the first hollow tube member 94 and the second tube member 96. The two finger members 102 are designed such that the holes 62 in the rafter segments 60 (shown in FIG. 5) slidably receive one finger member 102. The pin 100 shown in FIG. 11 has a rigid, elongated shaft having a length (not numbered) at least slightly greater than the diameter of the first hollow tube member 94 and a head (not numbered) having a sufficient size to prevent the pin 100 from passing through the pin hole in which the pin 100 is situate in its operable state. The telescopic arrangement of the ridgepole assembly 92 allows for its length L to be adjusted in increments determined by the spacing between each of the adjustment holes 98. Once the proper length L of the ridgepole assembly 92 is selected, the pin 100 is inserted through the pin hole concentrically aligned with the selected adjustment hole 98 as shown in FIG. 11. The properly-adjusted ridgepole assembly 92 can now be placed between the frame structures 56 as shown in FIG. 4. Upon dismantling of the ridgepole assembly 92, the pin 100 is simply removed and the second tube member 96 can be telescopically inserted into the first hollow tube member 94 for storage. The use of the ridgepole assembly 92 is optional. Its main purpose is to add lateral stability among the frame structures 56 if desired. Of course, other constructions of this ridgepole assembly 92 would be apparent to the ordinarily skilled artisans; for example, button latches could be substituted for the pins 100 to increase con- An alternative embodiment of the present invention is shown in FIGS. 12-14. A cover 312 extends across the bed of the pickup truck 22. Here, a rear cover portion 332 extends over front wall 25 and downwardly approximately four to five inches. Likewise, a rear cover portion 333 extends downwardly along tailgate 36 a similar distance of the pickup truck. With reference to FIG. 13, flap portions 104 can be attached to the front cover portion 332 and the rear cover portion 333. For example, in FIG. 13, mating hook and loop fastening strips 106 are added to releasably attach the ends of the flap portions 104 to retaining edge portions 330. Accordingly, the flap portions 104 will assist the front cover portion 332 and the front cover portion from fluttering during windy conditions or while the pickup truck is being driven. In FIG. 14, cooperative hook and loop strips 107 extend horizontally and longitudinally along retaining edge portion 330 to prevent the same from fluttering during windy conditions or while the pickup truck is being driven. In either embodiment, mechanical fasteners such as clasps or snaps could be employed in lieu of the cooperative mating hook and loop strips.

Erecting the tent structure 10 on to the pick truck is easy and rapid. To begin erecting the tent structure 10 onto the pickup truck, one insert adapter is slidably inserted into each stake pocket. To assemble the frame structures, each of two leg segments is releasably attached by swage connections to one rafter segment. The leg segments of each frame structure are slidably inserted into each insert hole of oppositely-disposed insert adapters to form an arch across the bed. The cover is draped across the frame structures which are now fixed in their vertical planes. Tensioning rod members are slidably inserted into the sleeve structures of the cover. After the rear tensioning rod member is slidably inserted into the rear panel sleeve structure, it is placed into the trough formed between the tailgate and deck of the pickup truck. The fastening devices are simple and easy to install by engaging the first hooks into the tensioning rod members and straps of the rear cover portion of the cover, stretching the flexible cord and engaging the second hooks to any anchoring portion of the pickup truck. Reversing the mode of erection results in easy and rapid dismantling of the tent structure from the could be easily disassembled into their respective segments for compact storage. The insert adapters can either remain in the pre-existing stake pockets or can be withdrawn from the pre-existing stake pockets and placed into storage. Within minutes, the tent structure can be dismantled from the pickup truck. Now, the pickup truck is prepared for work-related or other uses. It should finally be noted that erecting the vent structure is achieved without making any modifications to the pickup truck to facilitate any of the components of the present invention.

I claim:
1. A covering assembly adapted for use with a vehicle having a bed defined by a longitudinally extending deck and a pair of opposed side walls respectively located on opposite lateral sides of said deck, said side walls extending upwardly from said deck and terminating at upper side wall edges so that said bed has an interior, said cover assembly operative in use to enclose the interior to form a protected space and comprising:
(a) a cover formed of a flexible material and having a central cover portion adapted to be positioned over said bed so that said central cover portion extends in spaced relation across said deck between said side wall edges of said pair of opposed side walls and, said cover having a pair of retaining edge portions on opposite lateral sides of said central cover portion, each of said retaining edge portions adapted to extend downwardly alongside a respective one of said side walls exteriorly of said bed to terminate in a retaining edge;
(b) a pair of tensioning rod members each extending along and supported by a respective one of said retaining edge portions; and
(c) a fastening device associated with each said tensioning rod member and operative in use to interconnect the tensioning rod member to a respective anchor portion of said vehicle whereby a tensioning force may be applied to said tensioning rod members and thereby to the opposite lateral sides of said central cover portion in order to maintain said cover in a taut condition when said cover is in a secured state on said bed.

2. A covering assembly according to claim 1 including a frame assembly supported by said side walls and operative to form an arch across said bed, said central cover portion sized to be disposed over said frame assembly and to be supported thereby.

3. A covering assembly according to claim 2 wherein said frame assembly includes a plurality of trusses, each said truss formed substantially as an inverted U-shape structure operative to form an arch across said bed.

4. A covering assembly according to claim 2 wherein each of said side walls of said vehicle is provided with stake pockets and including a plurality of insert adapters adapted to mount in said stake pockets, each of said trusses securable to said side walls by respective ones of said insert adapters.

5. A covering assembly according to claim 1 wherein each of said retaining edge portions of said cover includes a sleeve structure sized to receive a respective one of said tensioning rod members.

6. A covering assembly according to claim 1 wherein each of said fastening devices includes a pair of hook elements interconnected by an elastic cord.

7. A covering assembly according to claim 1 wherein said cover includes a rear cover portion extending laterally across and downwardly from said central cover portion.

8. A covering assembly adapted for use with a vehicle having a bed defined by a longitudinally extending deck and a pair of opposed side walls respectively located on opposite lateral sides of said deck, said side walls extending upwardly from said deck and terminating at upper side wall edges so that said bed has an interior, said cover assembly operative in use to enclose the interior to form a protected space and comprising:
   (a) a frame assembly supported by said side walls and operative to form an arch across said bed;
   (b) a cover formed of a flexible material and having a central cover portion adapted to be positioned onto said frame assembly so that said cover extends in spaced relation across said deck between said side wall edges of said pair of opposed side walls and having a pair of retaining edge portions on opposite lateral sides of said central cover portion, each of said retaining edge portions adapted to extend downwardly alongside a respective one of said side walls exteriorly of said bed to terminate in a retaining edge;
   (c) a pair of tensioning rod members wherein each of said retaining edge portions of said cover supports a respective one of said tensioning rod members therealong; and
   (d) a fastening device associated with each said tensioning rod member and operative in use to interconnect a respective said tensioning rod member to a respective anchor portion of said vehicle whereby a tensioning force may be applied to said tensioning rod members and thereby to said opposite sides of said central cover portion in order to maintain said cover in a taut condition when said cover is in a secured state on said bed.

9. A covering assembly according to claim 8 including a sleeve structure on each of said retaining edge portion sized to receive a respective one of said tensioning rod members.

10. A covering assembly according to claim 8 wherein said frame assembly includes a plurality of trusses, each said truss forming an arch across said bed in a substantially vertical plane.

11. A covering assembly according to claim 10 wherein said trusses are arranged in vertical planes in spaced-apart parallel relation to one another.

12. A covering assembly according to claim 8 wherein said cover has a rear cover portion extending laterally across and downwardly from said central cover portion to terminate in a rear edge proximate to said deck and including a means for retaining said rear edge along said deck.

13. A tent structure adapted for use with a pickup truck having a bed defined by a longitudinally extending deck, a pair of opposed side walls respectively located on opposite lateral sides of said deck, a front wall located forwardly of said deck and a hinged tailgate located rearwardly of said deck, said side walls and said front wall extending upwardly from said deck to terminate in upper bed edge and said tailgate pivotable with respect to said deck between an open position and a closed position so that said bed has an interior, said side walls having stake pockets formed therein, said tent structure operative in use to enclose the interior to form a protected space and comprising:
   (a) a frame assembly including a plurality of inverted U-shaped trusses having downwardly disposed truss ends, said frame assembly operative to form an arch across said bed;
   (b) a plurality of insert adapters to be received and supported in said stake pockets, each said insert adapter having a cavity sized to receive one of said truss ends;
   (c) a cover formed of a flexible material and having a central cover portion adapted to be positioned over said frame assembly so that said cover extends in spaced relation across said deck between said upper bed edge along said pair of opposed side walls; and
   (d) a plurality of fastening devices associated with said cover and operative in use to interconnect said cover to a respective anchor portion of said vehicle whereby a tensioning force may be applied to opposite sides of said central cover portion in order to maintain said cover in a taut condition when said cover is in a secured state on said bed.

14. A tent structure according to claim 13 including a pair of tensioning rod members and wherein said cover includes a pair of retaining edge portions located on the opposite sides of said central cover portion, each said retaining edge portion adapted to extend downwardly alongside a respective one of said side walls exteriorly of said bed to terminate in a sleeve structure, each said sleeve structures sized to receive a respective one of said tensioning rod members thereby supporting said tensioning rod members along said retaining edge portions of said cover, said fastening devices operative to apply a tensioning force to said tensioning rod members and thereby to the opposite sides of said cover.

15. A tent structure according to claim 13 wherein each said insert adapter includes an elongated rigid body having an upper portion and a flange extending therearound.

16. A tent structure according to claim 15 wherein said flanges have rounded corner portions.

17. A tent structure according to claim 14 wherein said cover has a front panel portion extending downwardly from a front edge of said central cover portion to terminate in a front edge cover proximate to said upper bed edge along said front wall, said front panel edge securable to said vehicle, and wherein said cover portion has a rear panel portion extending downwardly from a rear edge of said central cover portion to terminate in a rear cover edge at a location along said deck proximate to said tailgate.

18. A tent structure according to claim 16 wherein said rear panel portion includes a doorway structure formed therethrough.

19. A tent structure according to claim 16 wherein said rear cover edge is formed as a rear sleeve structure extending laterally across said deck adjacent said tailgate and including a lateral rod member sized for removable insertion into said rear sleeve structure and a rear fastening device for securing said rear cover edge to said pickup truck.

20. A covering assembly adapted for use with a vehicle having a bed defined by a longitudinally extending deck and a pair of opposed side walls respectively located on opposite lateral sides of said deck, said side walls extending upwardly from said deck and terminating at upper side wall edges so that said bed has an interior, said side walls provided with stake pockets, said cover assembly operative in use to enclose the interior to form a protected space and comprising:

(a) a frame assembly including a plurality of trusses arranged in vertical planes in spaced-apart parallel relation to one another, each said truss forming an arch across said bed;

(b) a plurality of insert adapters adapted to mount in the stake pockets, each of said trusses securable to said side walls by said insert adapters;

(c) a cover formed of a flexible material and having a central cover portion adapted to be positioned onto said frame assembly so that said cover extends in spaced relation across said deck between said side wall edges of said pair of opposed side walls and having a pair of retaining edge portions on opposite lateral sides of said central cover portion, each of said retaining edge portions adapted to extend downwardly alongside a respective one of said side walls exteriorly of said bed to terminate in a retaining edge; and (d) a fastening device associated with each said retaining edge portion and operative in use to interconnect a respective said retaining edge portion to a respective anchor portion of said vehicle whereby a tensioning force may be applied to said retaining edge portions and thereby to said opposite sides of said central cover portion in order to maintain said cover in a taut condition when said cover is in a secured state on said bed.

21. A covering assembly according to claim 20 including a pair of tensioning rod members and wherein each of said retaining edge portions of said cover includes a sleeve structure sized to receive a respective one of said tensioning rod members thereby supporting said tensioning rod members along said retaining edge portions of said cover, said fastening devices operative to apply a tensioning force to said tensioning rod members and thereby to the opposite sides of said central cover portion.

22. A covering assembly according to claim 20 wherein said cover has a rear cover portion extending laterally across and downwardly from said central cover portion to terminate in a rear edge proximate to said deck and including a means for retaining said rear edge along said deck.

* * * * *